US012598080B2

(12) United States Patent (10) Patent No.: US 12,598,080 B2
Nagaoka (45) Date of Patent: Apr. 7, 2026

(54) CHARGE CONTROL DEVICE, STORAGE MEDIUM, AND CHARGE CONTROL METHOD

(71) Applicant: DENSO TEN Limited, Hyogo (JP)

(72) Inventor: Yoshinori Nagaoka, Kobe (JP)

(73) Assignee: DENSO TEN LIMITED, Kobe (JP)

( * ) Notice: Subject to any disclaimer, the term of this patent is extended or adjusted under 35 U.S.C. 154(b) by 61 days.

(21) Appl. No.: 18/600,827

(22) Filed: Mar. 11, 2024

(65) Prior Publication Data

US 2025/0202717 A1 Jun. 19, 2025

(30) Foreign Application Priority Data

Dec. 18, 2023 (JP) ................................. 2023-212694

(51) Int. Cl.
*H04L 9/32* (2006.01)
*H04L 9/08* (2006.01)
(52) U.S. Cl.
CPC ............ *H04L 9/3263* (2013.01); *H04L 9/321* (2013.01); *H04L 9/0825* (2013.01); *H04L 9/0861* (2013.01); *H04L 2209/84* (2013.01)
(58) Field of Classification Search
None
See application file for complete search history.

(56) References Cited

U.S. PATENT DOCUMENTS

| | | | | |
|---|---|---|---|---|
| 2012/0191242 A1* | 7/2012 | Outwater | ............. | G06Q 20/045 |
| | | | | 700/236 |
| 2015/0222604 A1* | 8/2015 | Ylonen | ..................... | H04L 9/14 |
| | | | | 713/171 |
| 2020/0156497 A1* | 5/2020 | Lee | .......................... | B60L 53/66 |
| 2021/0184865 A1* | 6/2021 | Jung | .......................... | H04L 9/30 |
| 2022/0150238 A1 | 5/2022 | Bhalerao | | |
| 2023/0402854 A1* | 12/2023 | Nagaoka | ............. | H04L 63/0823 |
| 2024/0073037 A1* | 2/2024 | McFarland, Jr. | ..... | H04L 9/0891 |
| 2024/0083289 A1* | 3/2024 | Bennett | ................. | B60L 53/305 |
| 2024/0174112 A1* | 5/2024 | Layouni | .................. | B60L 53/65 |
| 2024/0300372 A1* | 9/2024 | Misawa | .................. | B60L 58/12 |
| 2024/0333527 A1* | 10/2024 | Zhao | ........................ | B60L 53/65 |
| 2024/0430250 A1* | 12/2024 | Kanamaru | .............. | B60L 53/66 |

FOREIGN PATENT DOCUMENTS

| | | |
|---|---|---|
| DE | 60 2004 012 485 T2 | 3/2009 |
| JP | 2018-019415 A | 2/2018 |
| WO | 2021/031061 A1 | 2/2021 |

* cited by examiner

*Primary Examiner* — Michael Pyzocha
(74) *Attorney, Agent, or Firm* — Oliff PLC

(57) ABSTRACT

A charge control device for a vehicle includes: a controller configured to communicate with a charging facility for a charge authentication, the controller storing a first private key corresponding to a first certificate in a first area of a memory, wherein the controller is configured to: generate a second private key and a public key in response to a request from a certificate issuer; store the second private key in a second area of the memory different from the first area; transmit the public key to the certificate issuer to receive a second certificate issued by the certificate issuer; maintain use of the first private key until an installation completion of the second certificate; and use the second private key upon the installation completion.

10 Claims, 8 Drawing Sheets

CHARGE CONTROL DEVICE, STORAGE MEDIUM, AND CHARGE CONTROL METHOD

CROSS-REFERENCE RELATED APPLICATIONS

This application is based on and claims priority under 35 USC 119 from Japanese Patent Application No. 2023-212694 filed on Dec. 18, 2023, the contents of which are incorporated herein by reference.

TECHNICAL FIELD

The present disclosure relates to a charge control device, a program, and a charge control method.

BACKGROUND ART

Examples of a vehicle (also referred to as an electric vehicle) that can charge a drive battery by connecting an external power supply include a battery electric vehicle (BEV vehicle) and a plug-in hybrid (PHV) vehicle. Examples of a method for authenticating charging to the drive battery mainly include an external authentication means (EIM) and plug and charge (PnC).

In charging by PnC, a certificate is stored in a vehicle, the stored certificate and a signature generated by a private key corresponding to the certificate are transmitted to a charging facility (also referred to as a stand) from the vehicle to execute authentication when the vehicle is connected to the charging facility, and charging is started when the authentication is successful. When issuing the certificate, for example, an on-board computer generates an on-board computer public key and an on-board computer private key paired with the on-board computer public key and transmits a request for issuing the certificate regarding the on-board computer public key to a certificate authority. The certificate authority then receives the certificate issuing request transmitted by the on-board computer, signs the on-board computer public key contained in the certificate issuing request, and issues the certificate to the on-board computer. In this manner, the on-board computer acquires the certificate issued by the certificate authority in response to the certificate issuing request (for example, see Japanese Patent Application Laid-Open Publication No. 2018-19415).

However, in the related art, no consideration is given to a case in which an issued certificate is updated.

For example, when a certificate issued once is updated to a new certificate and a new private key is generated on the vehicle, a private key corresponding to the currently available certificate may be overwritten. For this reason, the private key corresponding to the currently available certificate may be lost, and the vehicle may fail in being authenticated by a signature until a new certificate for update is installed in the vehicle. An aspect of an embodiment disclosed herein is to provide a device or the like that can continuously be charged using a certificate even when a new certificate is installed in a vehicle in which a certificate has already been installed.

SUMMARY

One aspect of an embodiment disclosed herein is exemplified by a charge control device for a vehicle includes: a controller configured to communicate with a charging facility for a charge authentication. The controller stores a first private key corresponding to a first certificate in a first area of a memory. The controller is configured to generate a second private key and a public key in response to a request from a certificate issuer. The controller is configured to store the second private key in a second area of the memory different from the first area. The controller is configured to transmit the public key to the certificate issuer to receive a second certificate issued by the certificate issuer. The controller is configured to maintain use of the first private key until an installation completion of the second certificate. The controller is configured to use the second private key upon the installation completion.

In the charge control device, the controller stores a first private key corresponding to a currently valid first certificate and a second private key corresponding to a second certificate newly issued based on a request from an issuer in different storage destinations. Accordingly, the currently valid first private key is not overwritten with the newly generated second private key. For this reason, the controller can use the first private key until the installation completion of the second certificate. Upon the installation completion of the second certificate, the controller uses the second private key. In this manner, even when the new second certificate is installed in a vehicle in which the first certificate has already been installed, the charge control device can continue charging using the first certificate and the first private key corresponding thereto. Upon the installation completion of the second certificate, the charge control device can immediately shift to a process by the second certificate and the second private key corresponding thereto. That is, even when a new certificate is installed in a vehicle in which a certificate has already been installed, the charge control device can execute control to be continuously charged using the certificate.

BRIEF DESCRIPTION OF DRAWINGS

Exemplary embodiments of the present disclosure will be described in detail based on the following figures, wherein.

DESCRIPTION OF EMBODIMENTS

Hereinafter, a charge control device 10 and a computer program (hereinafter, simply referred to as a program) will be described.

First Embodiment

The charge control device 10, a program, and a charge control method according to a first embodiment will be described with reference to FIGS. 1 to 5.

Configurations

Figure 1:
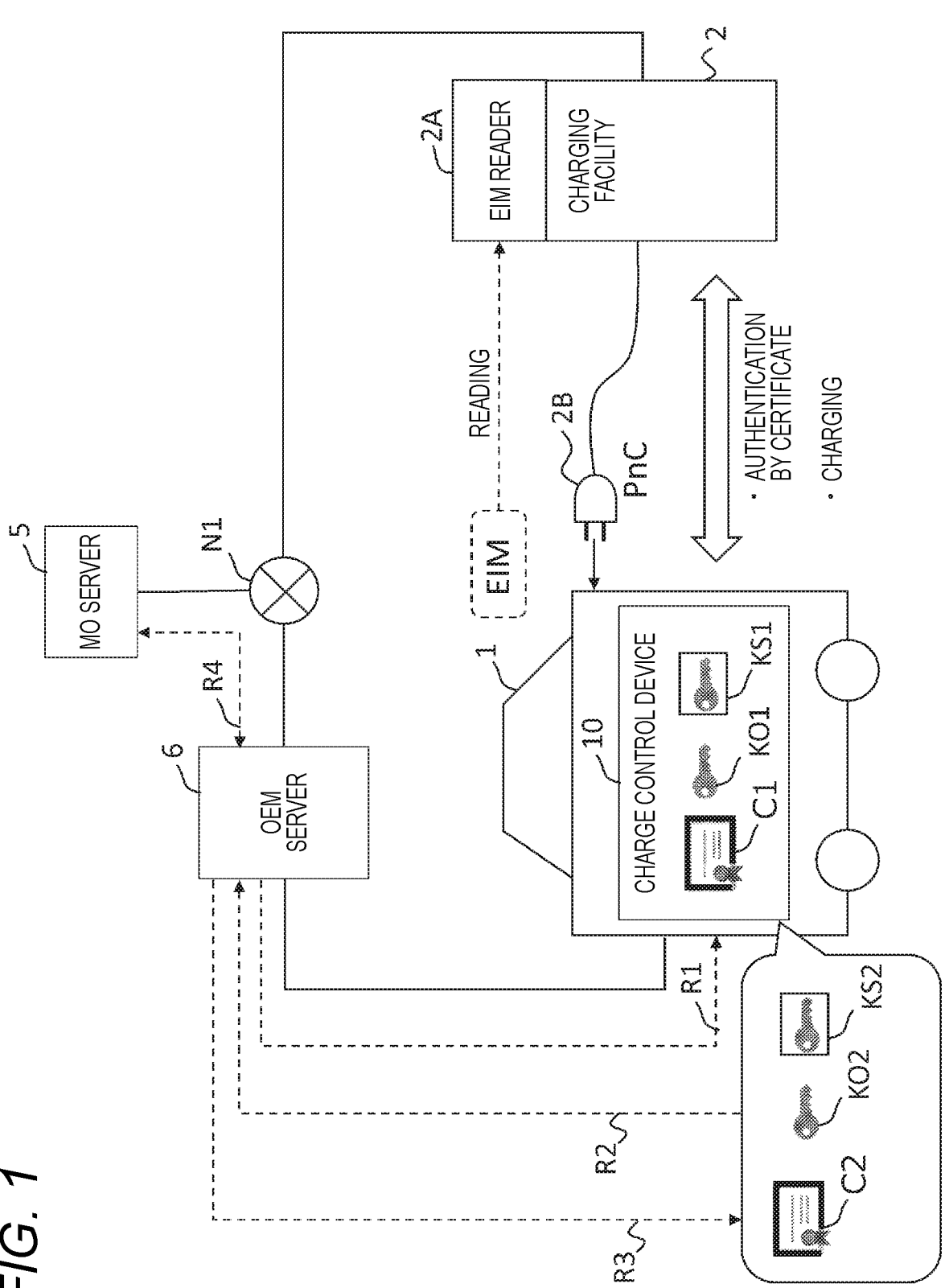
FIG. 1 shows a vehicle equipped with a charge control device according to a first embodiment.

FIG. 1 shows a vehicle 1 equipped with the charge control device 10 according to the present embodiment. FIG. 1 also shows a charging facility (electric vehicle supply equipment, EVSE) 2 that supplies electric power to a battery 19 (see FIG. 2, also referred to as a secondary battery or a storage battery) of the vehicle 1, and a MO server 5 and an original equipment manufacturing (OEM) server 6 that exchange information with the vehicle 1 or the charging facility 2.

The vehicle 1 is referred to as an electric vehicle, and can charge the drive battery 19. The vehicle 1 includes the charge control device 10, and executes a charge process or charge control with the charging facility 2. In the charge process or the like, as PnC which is a first authentication procedure, the charge control device 10 of the vehicle 1 creates a signature based on a contract certificate or the like and an encryption key and the charging facility 2 verifies the signature. When the authentication is successful, the vehicle 1 executes charging with the charging facility 2. The procedure by PnC is started, for example, when a plug 2B that supplies electric power from the charging facility 2 is connected to a power receiving unit of the vehicle 1.

In charging the vehicle 1, in addition to the procedure by PnC as described above, a procedure by an external authentication means (EIM) of presenting a RFID card or the like as a second authentication procedure is also possible. For this reason, the charging facility 2 includes an EIM reader 2A. The external authentication means is, for example, an authentication means based on user information acquired from a credit card, a QR code (registered trademark), radio frequency identification (RFID), or the like via the EIM reader 2A.

The charge control device 10 may be connected to the MO server 5, the OEM server 6, and the like via a network N1. The network N1 includes a wireless network such as a long term evolution (LTE), a 5th generation mobile communication system (5G), and a 6th generation mobile communication system (6G), and a wired public network such as the Internet.

For example, the charging facility 2 may transfer the signature transmitted from the vehicle 1 to the MO server 5 to request authentication by a user of the vehicle 1. When the authentication by the MO server 5 is successful, the charging facility 2 may charge the battery 19 of the vehicle 1 and charge the user of the vehicle 1 for the charging. When the vehicle 1 is charged, the vehicle 1 can request the charging facility 2 to install a contract certificate or the like. In this case, the vehicle 1 presents, to the charging facility 2, a certificate (such as an OEM provisioning certificate) issued from an OEM that is a manufacturer or a seller of the vehicle 1. When the charging facility 2 has a valid contract certificate or the like associated with the OEM provisioning certificate or the like notified from the vehicle 1, the charging facility 2 can provide the contract certificate or the like to the vehicle 1. The charging facility 2 may access the MO server 5, acquire the valid contract certificate or the like corresponding to the OEM provisioning certificate, and install the contract certificate or the like in the vehicle 1.

As described above, the certificate (the OEM provisioning certificate, a vehicle certificate, or the like) issued from the OEM that is the manufacturer or the seller of the vehicle 1 is installed in the vehicle 1, and is stored in a memory 12 (FIG. 2) of the charge control device 10. The user of the vehicle 1 makes a contract with a service provider (MO) in advance to get the battery 19 of the vehicle 1 charged by the charging facility 2. In accordance with this contract, the contract certificate or the like and an encryption key such as a private key are issued from the MO server 5 and installed in the vehicle 1 via, for example, the OEM server 6. The contract certificate and the encryption key may be referred to as certificate data. The certificate data such as the contract certificate may be installed in the vehicle 1 via, for example, the charging facility 2.

Hereinafter, the OEM provisioning certificate, the vehicle certificate, the contract certificate, and the like are collectively referred to as certificates. The certificates are electronic data installed in the vehicle 1, and are issued to the charge control device 10 of the vehicle 1 by an external computer such as a certificate authority, the MO server 5, and the OEM server 6. Here, the certificate authority refers to an authority authorized to issue a certificate to a company, an organization, an individual, and the like. In addition to certificate authorities belonging to a company such as an OEM, an organization, or the like, the certificate authority may be an authority independent of a company such as an OEM, an organization, an individual, or the like, and may be referred to as a root certificate authority having secured reliability by receiving an inspection.

The charge control device 10 may create an electronic signature (digital signature) based on a certificate or the like with a private key corresponding to the certificate, and request authentication to an external computer such as the charging facility 2, the MO server 5, the OEM server 6, or the certificate authority. In the present embodiment, the electronic signature is simply referred to as a signature. An external computer such as the charging facility 2, the MO server 5, the OEM server 6, or the certificate authority has a public key paired with the private key, and may determine whether authentication is possible by decrypting the signature. The private key and the public key may be an example of pair key information.

More specifically, the vehicle 1 is connected to the charging facility 2. A certificate (C) such as an OEM provisioning certificate or a Vehicle certificate issued from the OEM server 6 and a signature based on a private key (KS) are presented from the vehicle 1 to the charging facility 2. Then, the charging facility 2 verifies the signature using a public key of a corresponding certificate. In addition, expiration verification may be executed using an OCSP, a CRL, and the like.

The certificate may be distributed to and stored in a storage device accessible from the charging facility 2. The storage device accessible from the charging facility 2 is, for example, a memory 22 of the charging facility 2, an external storage unit 23, or a storage device such as a computer accessible by the charging facility 2 on the network N1.

In the present embodiment, an external computer that installs a certificate in the vehicle 1 via the network N1 is referred to as an issuer. For example, when the contract certificate is issued from the MO server 5 and is installed in the vehicle 1 via the OEM server 6 or the charging facility 2, the MO server 5 can be regarded as an issuer. In addition, for example, when the OEM Provisioning certificate or Vehicle certificate are issued from the OEM server 6 and installed in the vehicle 1, the OEM server 6 can be regarded as an issuer.

The present embodiment exemplifies a process of updating a certificate C1 and a private key KS1 corresponding to the certificate C1 that have already been installed in the charge control device 10 to a new certificate C2 and a private key KS2 corresponding to the certificate C2. That is, here, it is assumed that the certificate C1 is updated to the certificate C2 in the external computer such as the MO server 5, the OEM server 6, or the certificate authority.

For example, when the certificate C1 is updated in the OEM server 6, the OEM server 6 transmits a request for generating a certificate signing request (CSR) to the charge control device 10 of the vehicle 1 to which the certificate C1 has already been distributed (R1). Then, the charge control device 10 creates a pair of a public key KO2 and the private key KS2, and transmits a CSR including the public key KO2 of the created pair to the OEM server 6 (R2). Then, the OEM server 6 creates the new certificate C2 by, for example, signing the received public key KO2 with a private key obtained from the certificate authority by itself. The OEM server 6 may transfer the CSR to the MO server 5, request creation of the new certificate C2, and receive the certificate C2 from the MO server 5 (R4). The OEM server 6 distributes the created certificate C2 to the charge control device 10 and installs the certificate C2 in the charge control device 10, thereby updating the certificate C1 into the certificate C2 (R3).

Accordingly, the private key KS1 is revised to the private key KS2. Thereafter, the charge control device 10 creates a signature based on the updated certificate C2 and the private key KS2, and requests the charging facility 2 or the like for authentication. The charging facility 2, or the MO server 5, the OEM server 6, or the like to which the signature is transferred via the charging facility 2 determines whether the signature is appropriate using the revised public key KO2, and determines whether to authenticate the charge control device 10.

As described below, in the present embodiment, the charge control device 10 updates the certificate C1 and the private key KS1 to the new certificate C2 and the new private key KS2 in a state in which a signature using the existing private key KS1 is valid. Thus, in the present embodiment, when the charge control device 10 receives charging from the charging facility 2 by PnC, the charge control device 10 can stably be charged from the charging facility 2 regardless of whether the private key KS1 is updated to KS2.

The present embodiment describes an example of updating a certificate (for example, an OEM provisioning certificate or a vehicle certificate) according to a generation request from the OEM server 6. In update of a certificate (for example, a contract certificate) according to a generation request from the MO server 5, the MO server 5 may update the certificate of the charge control device 10 in the same manner via the OEM server 6. That is, the OEM server 6 may transmit a CSR generation request to the vehicle 1 in response to a request from the MO server 5. Then, the OEM server 6 may transfer a CSR received from the charge control device 10 to the MO server 5 and request issuance of a certificate. Further, the OEM server 6 may transfer the updated certificate issued from the MO server 5 to the charge control device 10.

Figure 2:
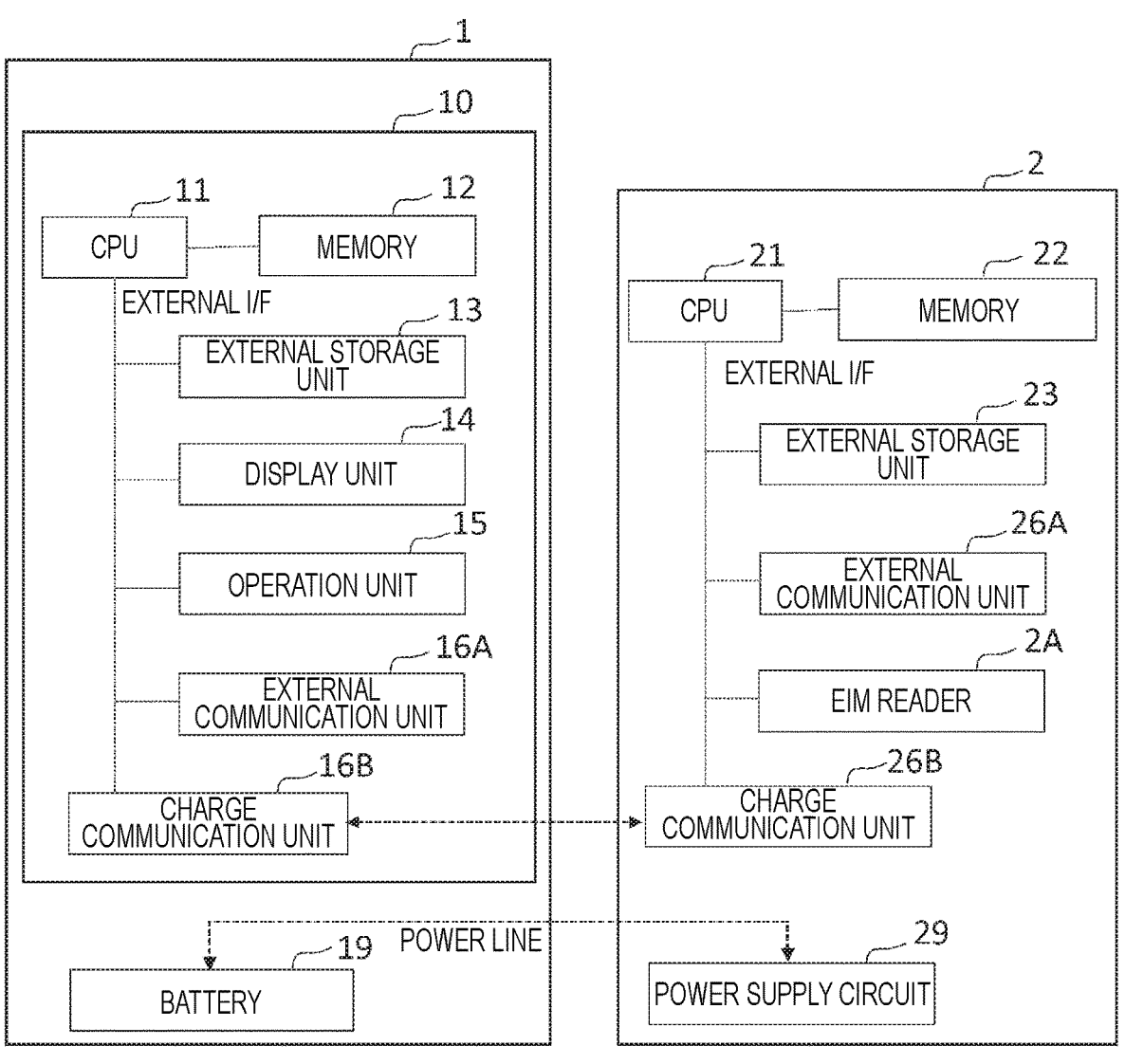
FIG. 2 shows hardware configurations of the vehicle and a charging facility.

FIG. 2 shows hardware configurations of the vehicle 1 and the charging facility 2. The charge control device 10 of the vehicle 1 and the charging facility 2 that charges the battery 19 mounted on the vehicle 1 constitute a charging system. The vehicle 1 includes the charge control device 10 and the battery 19 whose charging is controlled by the charge control device 10.

The charge control device 10 includes a CPU 11, the memory 12, and an external device connected to an external interface (I/F), and executes information processing according to a program. Examples of the external device include an external storage unit 13, a display unit 14, an operation unit 15, an external communication unit 16A, and a charge communication unit 16B. The CPU 11 and the memory 12 can be collectively referred to as a control unit. The control unit is also referred to as an electronic control unit (ECU). The control unit is an example of a controller.

The CPU 11 executes a computer program loaded in the memory 12 in an executable manner, and provides functions of the charge control device 10. The CPU 11 is also referred to as a processor or a micro controller unit (MCU). The memory 12 stores computer programs executed by the CPU 11, data processed by the CPU 11, and the like.

The memory 12 is a dynamic random access memory (DRAM), a static random access memory (SRAM), a read only memory (ROM), or the like. The external storage unit 13 is used as a storage area for assisting the memory 12, for example, and stores computer programs executed by the CPU 11, data processed by the CPU 11, and the like. The external storage unit 13 is a hard disk drive, a solid state drive (SSD), or the like.

The display unit 14 is, for example, a liquid crystal display or an electroluminescence panel. The operation unit 15 is, for example, a keyboard or a pointing device. The present embodiment exemplifies a touch panel including a touch sensor as a pointing device. The display unit 14 and the operation unit 15 function as user interfaces available to a user.

The external communication unit 16A exchanges data with another device (such as the OEM server 6 in FIG. 1) on a public network such as the network N1 (see FIG. 1). For example, the CPU 11 communicates with a computer of a business operator on a public network via the external communication unit 16A. The external communication unit 16A may be a wireless communication device that accesses a mobile phone network. The external communication unit 16A may be a communication device that accesses a wireless local area network (LAN). The external communication unit 16A is referred to as a telematics control unit (TCU), and may execute communication referred to as telematics via the network N1.

The charge communication unit 16B exchanges signals with a charge communication unit 26B. That is, the charge communication unit 16B executes communication with the charging facility 2 by, for example, a communication method based on power line communications (PLC) or similar to PLC. The charge communication unit 16B may execute communication with the charge communication unit 26B in accordance with a controller area network (CAN), wireless LAN, Ethernet, or the like, or in accordance with a communication procedure based thereon. The charge communication unit 16B may internally include a CPU, a memory, an input and output interface, a communication interface, and the like. In the present embodiment, the charge control device 10 communicates with the charging facility 2 via the external communication unit 16A or the charge communication unit 16B, and executes a charging request and an authentication process.

The charging facility 2 includes a CPU 21, a memory 22, and an external device connected to an external interface (I/F), and executes information processing according to a program. Examples of the external device include the external storage unit 23, a display unit 24, an operation unit 25, an external communication unit 26A, the charge communication unit 26B, and the EIM reader 2A. The charging facility 2 further includes a power supply circuit 29. Configurations of the charging facility 2 other than the EIM reader 2A and the power supply circuit 29 are the same as those of the charge control device 10 of the vehicle 1, and thus descriptions thereof are omitted.

The EIM reader 2A is a card reader that reads information from an IC card such as a credit card in a contact or non-contact manner, an image reading device that reads a QR code (registered trademark), an RFID reader, or the like. The power supply circuit 29 supplies power to the battery 19 and charges the battery 19. In FIG. 2, the charge communication unit 16B and the charge communication unit 26B, as well as the battery 19 and the power supply circuit 29, are connected via the plug 2B in FIG. 1.

That is, the charge control device 10 of the vehicle 1 communicates with the charging facility 2 when the plug 2B is connected to a connection portion, which includes a power receiving unit of a power circuit and a terminal of the charge communication unit 16, in the vehicle 1 that charges the battery 19B. The charge control device 10 of the vehicle 1 communicates with the charging facility 2 via, for example, the charge communication units 16B and 26B, and executes PnC by TLS authentication and vehicle-to-grid (V2G) communication. The charge control device 10 of the vehicle 1 and the charging facility 2 mutually authenticate each other by the TLS authentication and the V2G communication, charge the battery 19 of the vehicle 1, and execute an authentication process regarding charging. The charge control device 10 of the vehicle 1 and the charging facility 2 may communicate with each other via the external communication units 16A and 26A when the plug 2B is connected to the connection portion in the vehicle 1, which includes the power receiving unit of the power circuit and the terminal of the charge communication unit 16B.

The MO server 5 and the OEM server 6 have the same configurations as the CPUs 11 and 21, the memories 12 and 22, the external storage units 13 and 23, the display units 14 and 24, the operation units 15 and 25, the external communication units 16A and 26A, and the like. The MO server 5 and the OEM server 6 are general computers. The MO server 5 and the OEM server 6 may be a set of a plurality of computers referred to as cloud.

The MO server 5 may be referred to as a computer of a business operator (MO) that provides a service for charging the vehicle 1 to the user. The charging facility 2 may be managed and operated by a business operator referred to as a charge point operator (CPO) in addition to a MO. The OEM server 6 may be referred to as a computer of a business operator related to manufacturing or selling of the vehicle 1.

Procedure for Updating Certificate and Private Key

Figure 3:
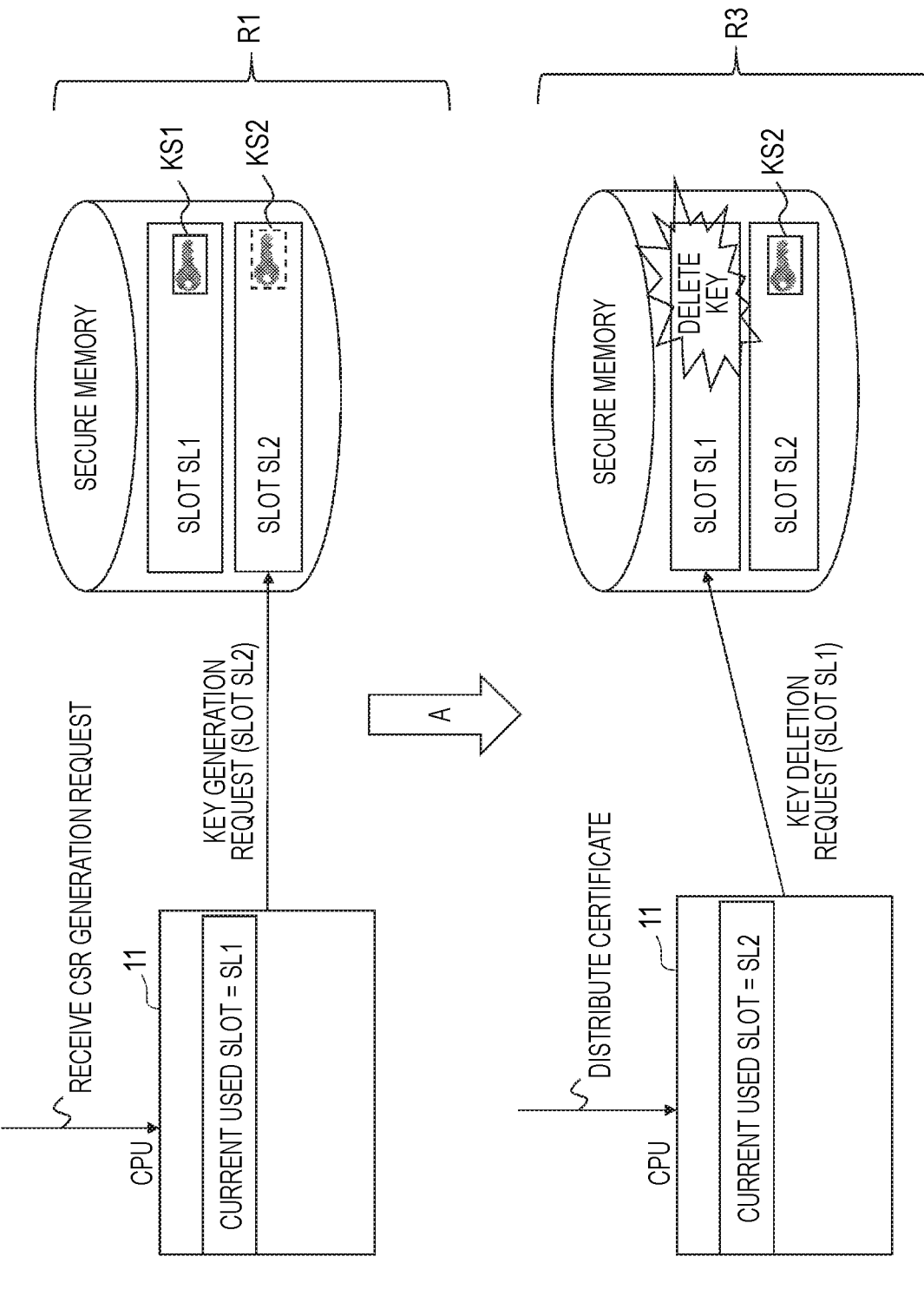
FIG. 3 shows a procedure for updating a private key by the charge control device according to the first embodiment.

FIG. 3 shows a procedure for updating a private key by the charge control device 10 according to the present embodiment. In FIG. 3, an arrow A in middle shows a transition from a process with a symbol R1 to a process with a symbol R3. The process with the symbol R1 above the arrow A in FIG. 3 corresponds to the symbol R1 in FIG. 1. The process with the symbol R1 is a process when the charge control device 10 receives a CSR generation request. The process with the symbol R3 below the arrow A in FIG. 3 corresponds to the symbol R3 in FIG. 1. The process with the symbol R3 is a process when the charge control device 10 installs the certificate C2 received from the OEM server 6 and stores the certificate C2 in a secure memory in the memory 12 or the external storage unit 13.

Here, for example, the charge control device 10 has already stored the private key KS1 corresponding to the certificate C1 in a slot SL1 in the secure memory in the memory 12 or the external storage unit 13. In a register of the CPU 11, it is registered that a currently used slot is SL1. That is, the charge control device 10 stores a first private key (the private key KS1) corresponding to an installed first certificate (the certificate C1) in a first area (the slot SL1) of the memory 12 or the like. The certificate C1 is an example of the first certificate, the private key KS1 is an example of the first private key, and the slot SL1 is an example of the first area. Here, the secure memory is a storage device that checks authenticity or legitimacy of access in response to an access request from the CPU 11 and permits access (read or write) when the authenticity or legitimacy is confirmed. For example, the charge control device 10 sends a signature signed with a specific encryption key to the secure memory to request the secure memory to check the authenticity. Slots SL1 and SL2 are storage destinations in the secure memory and are, for example, addresses and register numbers.

In this state, for example, when a request for updating the certificate C1 to the new certificate C2 is generated in the OEM server 6, a CSR generation request is transmitted from the OEM server 6 to the charge control device 10. Upon receiving the CSR generation request, the charge control device 10 creates a pair of the public key KO2 and the private key KS2, and requests the slot SL2 of the secure memory to store the private key KS2 (also referred to as generation of information). Thus, the new private key KS2 is stored in the slot SL2 while the existing private key KS1 is maintained in the slot SL1. Then, the charge control device 10 generates a CSR including the public key KO2 and transmits the CSR to the OEM server 6 (R2 in FIG. 1).

Then, in the process below with the symbol R3, for example, the OEM server 6 creates the certificate C2 for the CSR and transmits the certificate C2 to the charge control device 10. Upon receiving the certificate C2, the charge control device 10 changes the currently used slot to SL2 in the register, and instructs the secure memory to delete (erase) the private key KS1 in the slot SL1. Accordingly, the private key KS1 in the slot SL1 is deleted (or erased), and a process such as signature by the private key KS2 in the slot SL2 is executed. As described above, in the present embodiment, the charge control device 10 manages one type of key stored in the secure memory with two slots. Accordingly, when the number of types of keys to be managed is K (K is an integer), the charge control device 10 may prepare 2*K slots.

In FIG. 3, the private keys KS1 and KS2 are stored in the slots SL1 and SL2 of the secure memory. The charge control device 10 may also store a key pair, that is, a pair of the private key KS1 and the public key KO1 or a pair of the private key KS2 and the public key KO2 in the slots SL1 and SL2 of the secure memory. When the private keys KS1 and KS2 are stored in the slots SL1 and SL2 of the secure memory, the public keys KO1 and KO2 may be stored in an area other than the secure memory of the memory 12. This is because, compared to the private keys KS1 and KS2, the public keys KO1 and KO2 are less required or less necessary to be stored to improve safety.

Hereinafter, the certificate C1, the public key KO1, and the private key KS1 may be referred to as the first certificate C1, the first public key KO1, and the first private key KS1. The certificate C2, the public key KO2, and the private key KS2 may be referred to as a second certificate C2, a second public key KO2, and a second private key KS2.

Figure 4:
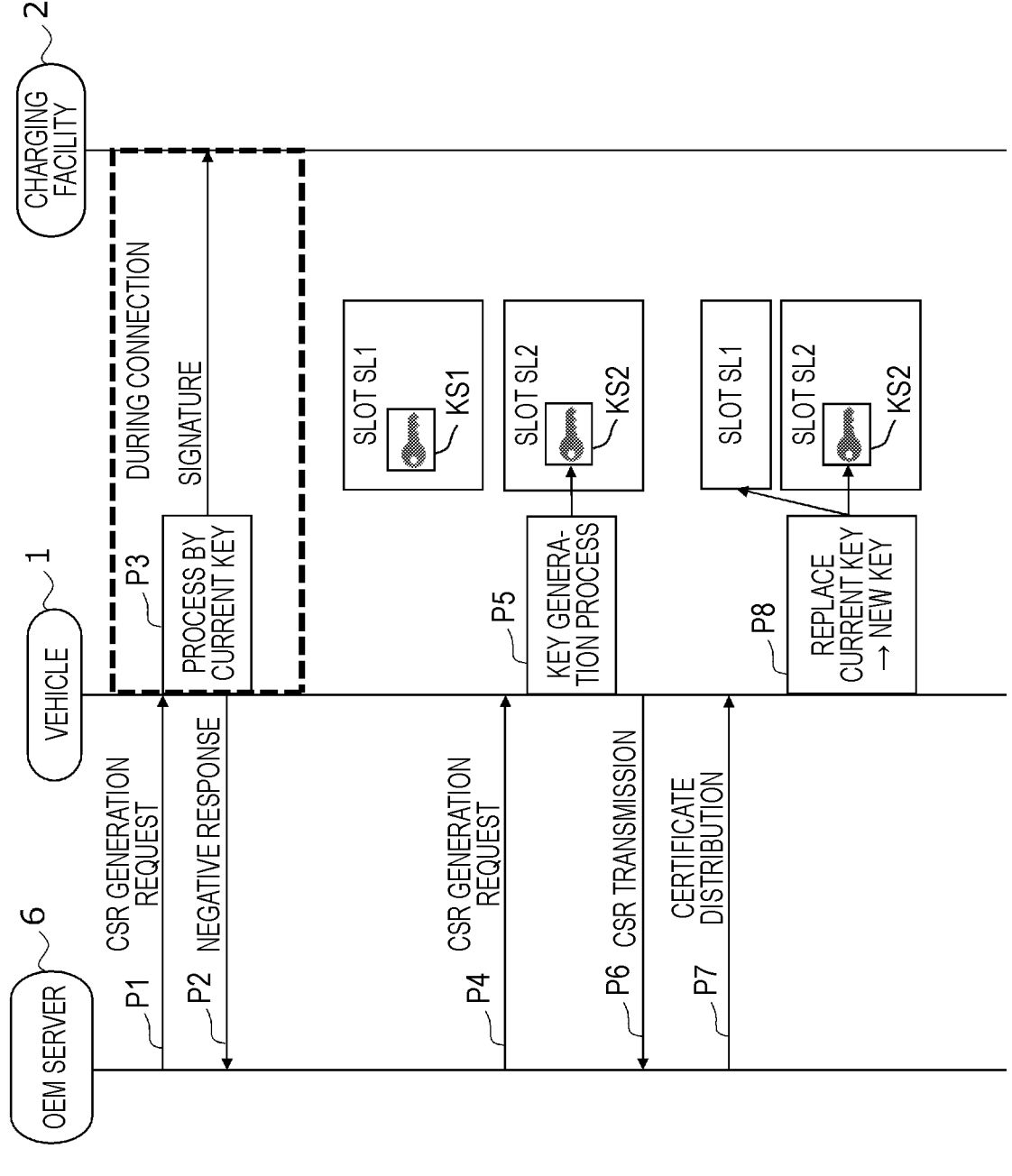
FIG. 4 is a sequence diagram showing a process of updating a certificate according to the first embodiment.

FIG. 4 is a sequence diagram showing a process of updating a certificate according to the first embodiment. FIG. 4 exemplifies a case in which a request for updating the certificate occurs in the OEM server 6. When a request for updating the certificate occurs in the OEM server 6, the OEM server 6 transmits a CSR generation request to the charge control device 10 of the vehicle 1 (P1). The CSR generation request in P1 is an example of a request from a certificate issuer. The OEM server 6 is an example of the certificate issuer. In the example of FIG. 4, it is assumed that the CSR generation request is received by the charge control device 10 while the vehicle 1 is connected to the charging facility 2 by the plug 2B (FIG. 1) (see a dotted frame). In the sequence diagram of FIG. 4, a vertical axis corresponds to elapse of time.

Upon receiving the CSR generation request while the vehicle 1 is connected to the charging facility 2, the charge control device 10 returns a response (hereinafter, referred to as a negative response) indicating that the charge control device 10 does not respond to the CSR generation request to the OEM server 6 (P2). The process of P2 is an example in which, upon receiving a request from the OEM server 6 that is the issuer, the request is rejected when the charge control device 10 is connected to the charging facility 2. Then, the charge control device 10 executes a process during connection to the charging facility 2, for example, a process by the current private key KS1, or continues a process that was being executed (P3). The process by the current private key KS1 includes, for example, generating a signature and requesting the charging facility 2 to authenticate the signature. For example, the charge control device 10 executes charge control with the charging facility 2 based on the valid private key KS1 and the certificate C1 corresponding to the valid private key KS1. Here, the current private key KS1 is stored in the slot SL1, and it is registered in the register of the charge control device 10 that the currently used slot is the slot SL1.

Then, the OEM server 6 retransmits a CSR generation request to the charge control device 10 of the vehicle 1 (P4). The CSR generation request in P4 is also an example of a request from the certificate issuer. When the charge control device 10 receives the CSR generation request again, the vehicle 1 is not connected to the charging facility 2. Upon receiving the CSR generation request in a state in which the vehicle 1 is not connected to the charging facility 2, the charge control device 10 executes a key generation process (P5). The key generation process is, for example, as described in FIG. 3. Then, the charge control device 10 requests the secure memory to store the new private key KS2 in the slot SL2 while maintaining the current private key KS1 in the slot SL1. Accordingly, it can be said that the charge control device 10 does not overwrite the private key KS1 that is the first private key with the private key KS2 that is the second private key.

The process of P5 is an example of generating the second private key and public key in response to a request from the certificate issuer. The private key KS2 generated in P5 is an example of the second private key. At this time, the public key KO2, the pair of the private key KS2, is also generated. Storing the new private key KS2 in the slot SL2 is an example of saving the second private key in a second area different from the first area of the memory 12 or the like. That is, the slot SL2 is an example of the second area. Further, maintaining the current private key KS1 in the slot SL1 is an example of using the first private key until installation of the second certificate is completed. That is, the charge control device 10 executes the charge control with the charging facility 2 based on the valid private key KS1 and the certificate C1 corresponding to the valid private key KS1 until the second certificate (the certificate C2) corresponding to the public key KO2 is installed.

Then, the charge control device 10 transmits a CSR including the public key KO2 created as a pair with the private key KS2 to the OEM server 6 (P6). The process of P6 is an example of transmitting the public key to the issuer. Upon receiving the CSR including the public key KO2 from the charge control device 10, the OEM server 6 creates the certificate C2 based on the public key KO2 and signs the certificate C2 using a private key issued from the certificate authority. Then, the OEM server 6 distributes the certificate C2 to the charge control device 10 (P7).

Upon receiving the certificate C2, the charge control device 10 registers that the currently used slot is the slot SL2 in the register, requests the secure memory to delete (also referred to as erase) the private key KS1 of the slot SL1, and causes the secure memory to execute the deletion (erasure) (P8). In P8, receiving the certificate C2 and registering in the register that the currently used slot is the slot SL2 is an example of installing the second certificate. In this way, in the charge control device 10, an OEM provisioning certificate and a vehicle certificate and the like, as well as a private key and the like corresponding thereto, are revised. For example, the charge control device 10 executes charge control with the charging facility 2 based on the valid private key KS2 and the certificate C2 corresponding to the valid private key KS2. That is, when the installation of the second certificate (the certificate C2) corresponding to the private key KS2 is completed, the charge control device 10 erases the private key KS1 that is the first private key. Then, the charge control device 10 executes charge control with the charging facility 2 based on the valid second private key (the private key KS2) and the second certificate (the certificate C2). In the charge control device 10, a procedure for revising a private key corresponding to a contract certificate is the same as the process of FIG. 4 except that both the OEM server 6 and the MO server 5 are interposed.

Also in FIG. 4, the private keys KS1 and KS2 are stored in the slots SL1 and SL2 of the secure memory. The charge control device 10 may also store a key pair, that is, a pair of the private key KS1 and the public key KO1 or a pair of the private key KS2 and the public key KO2 in the slots SL1 and SL2 of the secure memory. When the private keys KS1 and KS2 are stored in the slots SL1 and SL2 of the secure memory, the public keys KO1 and KO2 may be stored in an area other than the secure memory of the memory 12 or the external storage unit 13.

Figure 5:
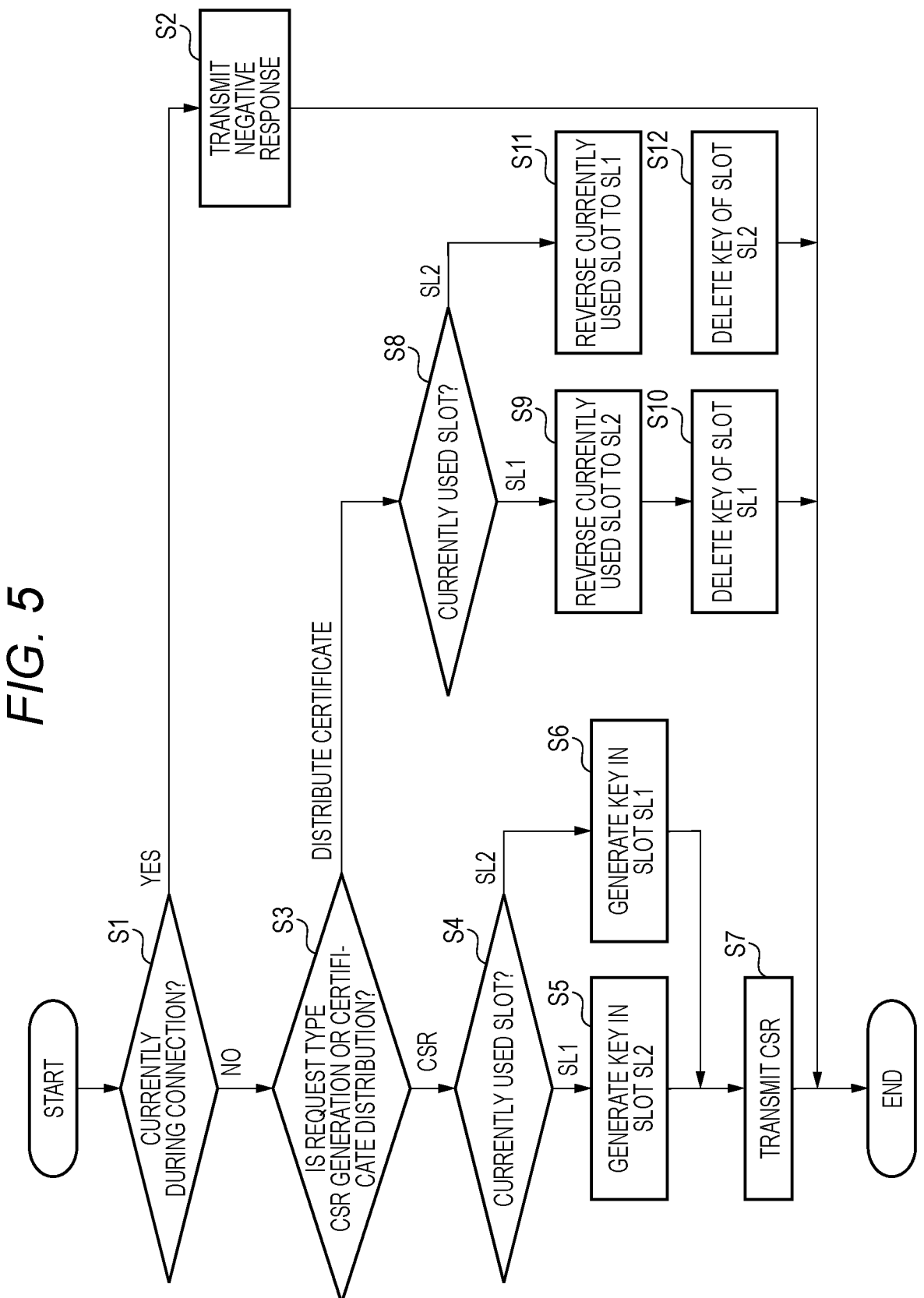
FIG. 5 is a flowchart showing an update process of a certificate and a key pair by the charge control device according to the first embodiment.

FIG. 5 is a flowchart showing an update process of a certificate and a key pair by the charge control device 10 according to the first embodiment. The process is started, for example, when the charge control device 10 receives a request from an external device such as the OEM server 6 via the external communication unit 16A. At the time of the start, it is assumed that the currently used private key is the private key KS1 and the certificate C1 is valid.

In the process of FIG. 5, the charge control device 10 determines whether the vehicle 1 is currently connected to the charging facility 2 (S1). That the vehicle 1 is connected to the charging facility 2 means, for example, a state in which the plug 2B (FIG. 1) of the charging facility 2 is connected to the connection portion of the vehicle 1, which includes the power receiving unit connected to the battery 19 and a communication terminal. When the plug 2B of the charging facility 2 is connected to the connection portion of the vehicle 1, for example, the charge communication unit 26B (FIG. 2) transmits a pulse signal or the like defined by specifications or standards of the device to the charge communication unit 16B. For this reason, the charge control device 10 can detect the connection with the charging facility 2 via the charge communication unit 16B.

When the vehicle 1 is currently connected to the charging facility 2 (YES in S1), the charge control device 10 transmits a negative response to the OEM server 6 (S2). Then, the charge control device 10 ends the process.

On the other hand, when the vehicle 1 is not currently connected to the charging facility 2 (NO in S1), the charge control device 10 determines a type of the request received via the external communication unit 16A (S3). When the type of the received request is a CSR generation request (CSR in S3), the charge control device 10 reads a slot number of the currently used slot from the register and determines a slot number of the currently used slot (S4).

When it is determined in S4 that the currently used slot is SL1, the charge control device 10 generates a pair of the public key KO2 and the private key KS2 in the slot SL2 (S5). The charge control device 10 may generate the pair of the public key KO2 and the private key KS2 in the memory 12 or the external storage unit 13, and request the secure memory to register both of them in the slot SL2. The charge control device 10 may request the secure memory to register only the private key KS2 of the generated key pair in the slot SL2. This is because it is desirable that the private key KS2 be kept secret while ensuring security. Further, the pair of the public key KO2 and the private key KS2 may be generated in the secure memory.

In any case, by the process of S5, the charge control device 10 stores the private key KS1 corresponding to the currently valid certificate C1 and the private key KS2 corresponding to the certificate C2 to be newly acquired in the future in different slots SL1 and SL2, respectively. The charge control device 10 validates the private key KS1 until the installation of the new certificate C2 is completed, and validates the private key KS2 when the installation of the new certificate C2 is completed.

On the other hand, when it is determined in S4 that the currently used slot is SL2, a pair of the public key KO2 and the private key KS2 is generated in the slot SL1 (S6). The process of S6 is the same as the process of S5, and thus a description thereof is omitted. After the process of S5 or the process of S6, the charge control device 10 transmits a CSR including the public key KO2 generated in the process of S5 or S6 to the OEM server 6 (S7).

When it is determined in S3 that the request is distribution of a certificate (the certificate distribution in S3), the charge control device 10 refers to the number of the currently used slot from the register and determines the slot number of the currently used slot (S8). When it is determined in S8 that the currently used slot is SL1, the charge control device 10 inverts the slot number of the currently used slot of the register to SL2 (S9).

Then, the charge control device 10 deletes the key of the slot SL1 (S10). In the process of S10, when the key pair is stored in the slot SL1, the charge control device 10 may delete the key pair. On the other hand, when only the private key KS1 is stored in the slot SL1, the charge control device 10 may delete the stored private key KS1.

On the other hand, when it is determined in S8 that the currently used slot is SL2, the charge control device 10 inverts the slot number of the currently used slot of the register to SL1 (S11). Then, the charge control device 10 deletes the key of the slot SL2 (S12). The process of S12 is the same as that of S10, and thus a description thereof is omitted.

Effects of First Embodiment

As described above, the charge control device 10 generates pair key information on the first private key KS1 and the first public key KO1 in response to a request from an external device such as the OEM server 6 that is a certificate issuer. Then, the charge control device 10 transmits a CSR including the first public key KO1 to the issuer and installs the issued first certificate C1. Then, the charge control device 10 creates a signature based on the installed first certificate C1 and the first private key KS1, and executes charge control with the charging facility 2.

In the present embodiment, the charge control device 10 receives a CSR generation request from the OEM server 6 or the like in a state in which the existing first private key KS1 is installed. Then, the charge control device 10 newly creates a pair of the second public key KO2 and the second private key KS2, and sends a CSR including the second public key KO2 to the OEM server 6 or the like. Then, the charge control device 10 newly acquires and installs the second certificate C2. At this time, the charge control device 10 stores the first private key KS1 corresponding to the currently valid first certificate C1 and the second private key KS2 corresponding to the new second certificate C2 issued based on a request from the OEM server 6 or the like in the slots SL1 and SL2 which are different storage destinations.

The charge control device 10 validates the first private key KS1 until the installation of the second certificate C2 is completed, and validates the second private key KS2 when the installation of the second certificate C2 is completed. Accordingly, the charge control device 10 can execute a process by the first private key KS1 from when the pair of the second public key KO2 and the second private key KS2 is created until the installation of the second certificate C2 is completed. That is, the charge control device 10 can create a signature using the first private key KS1 corresponding to the first certificate C1 that has been valid until then, and request an external device such as the charging facility 2 for authentication.

When the installation of the second certificate C2 is completed, the charge control device 10 erases the first private key KS1. Accordingly, the charge control device 10 can effectively use the secure memory with less waste.

Further, when the charge control device 10 is connected to the charging facility 2 and receives a request from the OEM server 6 or the like that is an issuer, the charge control device 10 rejects the request by returning a negative response. Accordingly, the charge control device 10 can execute a process with less load by reducing the number of parallel processes in the process of requesting creation of the certificate and the process of requesting authentication by the signature.

Second Embodiment

Hereinafter, the charge control device 10 and a program according to a second embodiment will be described with reference to FIG. 6. In the first embodiment, when the charge control device 10 receives a request from an external device such as the OEM server 6 and the vehicle 1 is connected to the charging facility 2, the charge control device 10 returns a negative response and ends the process. However, instead of returning the negative response, the charge control device 10 may wait while the vehicle 1 is connected to the charging facility 2. In the second embodiment, processes other than the process in which the charge control device 10 waits while the vehicle 1 is connected to the charging facility 2 are the same as those in the first embodiment. Here, configurations and processes of the charge control device 10 according to the first embodiment are appropriately referred to, and are also applied to the present embodiment.

Figure 6:
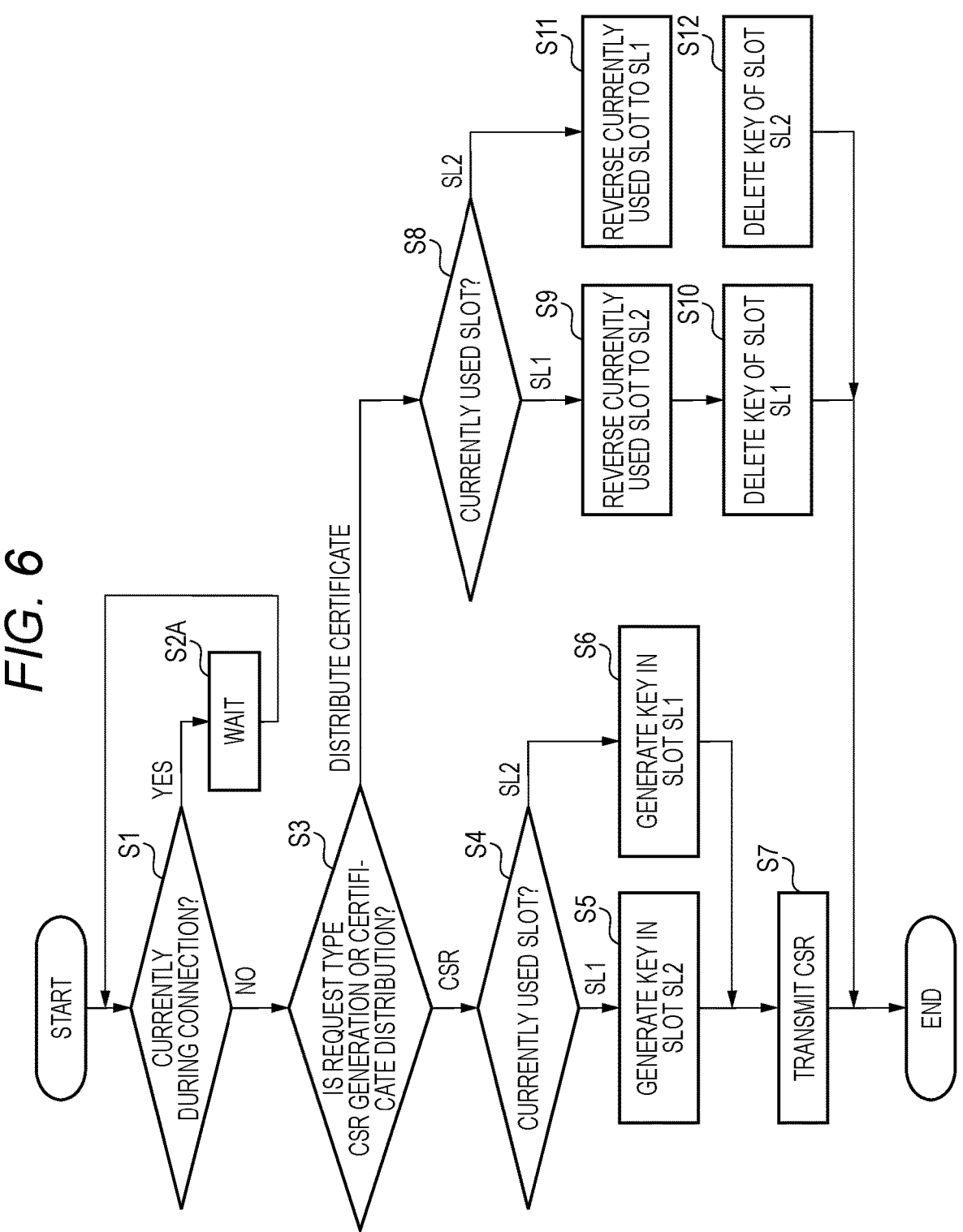
FIG. 6 is a flowchart showing an update process of a certificate and a key pair by a charge control device according to a second embodiment.

FIG. 6 is a flowchart showing an update process of a certificate and a key pair by the charge control device 10 according to the second embodiment. As in the first embodiment, the process is started, for example, when the charge control device 10 receives a request from the OEM server 6 or the like via the external communication unit 16A. In the process, as in the first embodiment, the charge control device 10 determines whether the vehicle 1 is currently connected to the charging facility 2 (S1).

When the vehicle 1 is currently connected to the charging facility 2, the charge control device 10 waits (S2A). The waiting may be waiting for a time until a timeout occurs by a timer. The charge control device 10 may also wait until detecting that the connection with the charging facility 2 is disconnected via the external communication unit 16A. During the waiting period, the charge control device 10 may execute a process by a current key shown in P3 of FIG. 4 in another parallel process.

After waiting, when the vehicle 1 is not connected to the charging facility 2, the charge control device 10 executes processes of S3 and thereafter. The processes of S3 and thereafter in FIG. 6 are the same as those in FIG. 5, and thus descriptions thereof are omitted.

As described above, in the present embodiment, upon receiving a request from an external device such as the OEM server 6 when the vehicle 1 is connected to the charging facility 2, the charge control device 10 waits without executing a process of generating a CSR and a process of transmitting the CSR. After waiting, when the vehicle 1 is not connected to the charging facility 2, the charge control device 10 executes processes of S3 and thereafter. For this reason, even when the charge control device 10 receives a CSR generation request, the charge control device 10 can create a signature using the currently used private key KS1 and request authentication to an external device such as the charging facility 2. In addition, when the vehicle 1 is not connected to the charging facility 2 after waiting, the charge control device 10 executes the processes of S3 and thereafter, and thus can reduce the number of parallel processes and reduce the load.

Third Embodiment

Hereinafter, the charge control device 10 and a program according to a third embodiment will be described with reference to FIGS. 7 and 8. In the first embodiment, upon receiving a request from an external device such as the OEM server 6 and the vehicle 1 is connected to the charging facility 2, the charge control device 10 returns a negative response and ends the process. In the second embodiment, the charge control device 10 waits without returning a negative response.

In the present embodiment, the charge control device 10 executes in parallel a process of requesting authentication by a signature using the currently used private key KS1 and a process of updating the private key KS1 to the private key KS2 using a CSR. In the third embodiment, configurations and processes of the charge control device 10 are the same as those according to the first embodiment and the second embodiment except that the process of requesting the authentication or the like by the signature and the process of updating the private key KS1 to the private key KS2 by the CSR are executed in parallel. Here, configurations and processes of the charge control device 10 according to the first embodiment and the second embodiment are appropriately referred to, and are also applied to the present embodiment.

Figure 7:
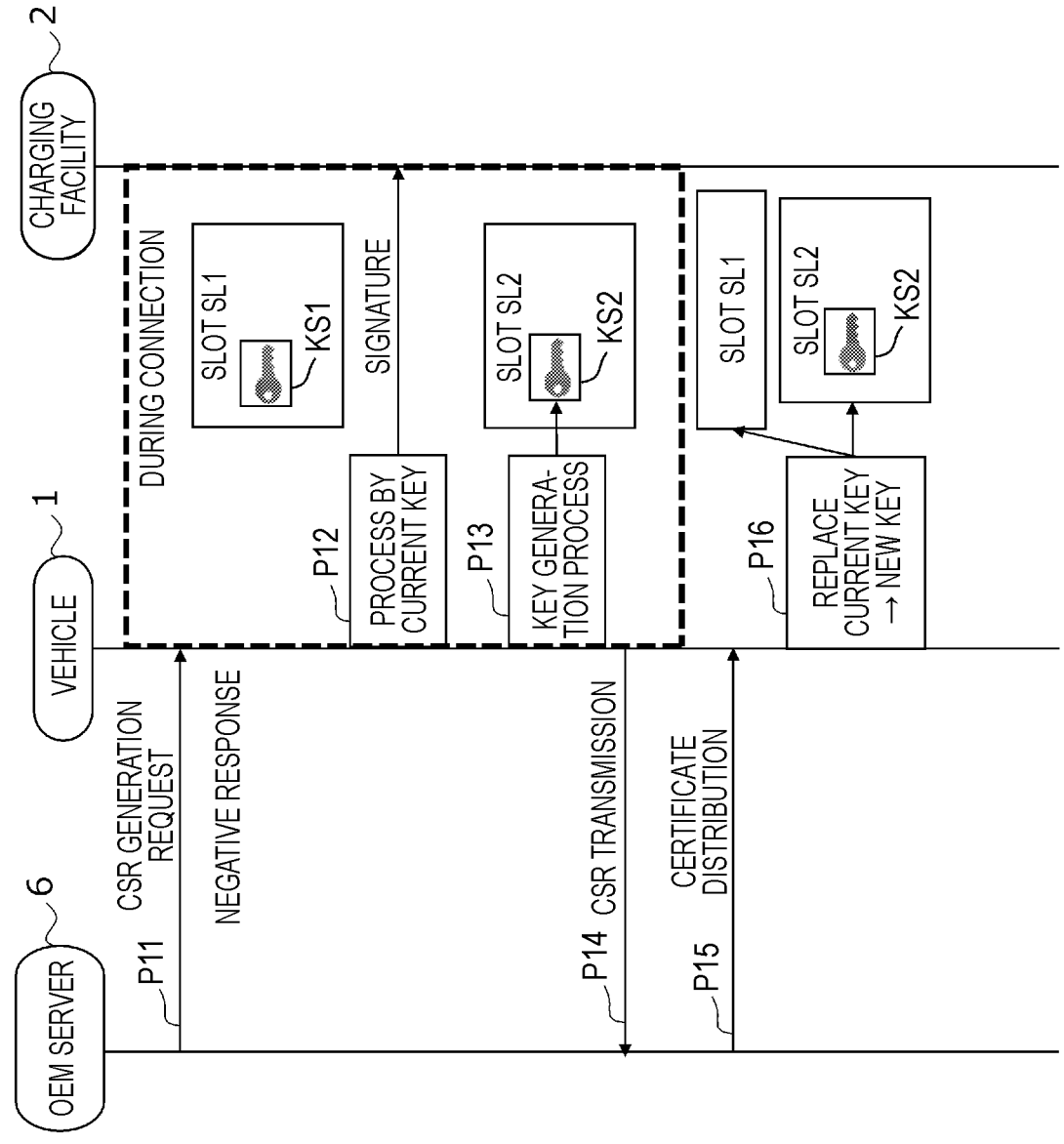
FIG. 7 is a sequence diagram showing a process of updating a certificate according to a third embodiment.

FIG. 7 is a sequence diagram showing a process of updating a certificate according to the third embodiment. Similarly to FIG. 4, for example, when a request for updating the current certificate C1 occurs in the OEM server 6, the OEM server 6 transmits a CSR generation request to the charge control device 10 of the vehicle 1 (P11). Here, the vehicle 1 is currently connected to the charging facility 2. In this case, for example, the charge control device 10 may be executing a process by the current private key KS1 (P12). The process by the private key KS1 includes, for example, creation of a signature by the private key KS1 and a request for authentication to the charging facility 2.

In this manner, even when the vehicle 1 is being connected to the charging facility 2, the charge control device 10 executes a key generation process regardless of the connection to the charging facility 2 (P13). The process in P13 is the same as the key generation process in FIG. 4. That is, the charge control device 10 requests the secure memory to store the new private key KS2 in the slot SL2 while maintaining the current private key KS1 in the slot SL1. That is, in the process of P13, upon receiving the request from the OEM server 6 that is an issuer when the vehicle 1 is connected to the charging facility 2 authorizing based on the first certificate (the certificate C1) corresponding to the first private key (the private key KS1) and the first private key, the charge control device 10 stores the second private key (the private key KS2).

FIG. 7 shows an example in which the charge control device 10 executes the key generation process in P13 after the process by the current private key KS1 in P12. However, the charge control device 10 may execute the process by the current private key KS1 in P12 and the key generation process in P13 in parallel. Then, the charge control device 10 transmits a CSR including the public key KO2 created as a pair with the private key KS2 to the OEM server 6 (P14). By the processes of P13 and P14, the charge control device 10 requests the OEM server 6 to install the second certificate (the certificate C2) corresponding to the private key KS2, and uses the first private key (the private key KS1) at least while the charge control device 10 is connected to the charging facility 2. That is, the charge control device 10 executes charge control with the charging facility 2 authorizing based on the valid private key KS1 and the certificate C1 corresponding to the private key KS1.

Next, the charge control device 10 receives distribution of a revised certificate from the OEM server 6, for example (P15). Upon receiving the revised certificate, the charge control device 10 replaces the current private key KS1 with the new private key KS2. That is, the charge control device 10 registers that the currently used slot is the slot SL2 in a register, requests the secure memory to delete (erase) the private key KS1 of the slot SL1, and causes the secure memory to execute the deletion (erasure) (P16). That is, when the installation of the second certificate (the certificate C2) corresponding to the private key KS2 is completed, the charge control device 10 erases the private key KS1 and executes the charge control with the charging facility 2 based on the valid private key KS2 and the second certificate.

Figure 8:
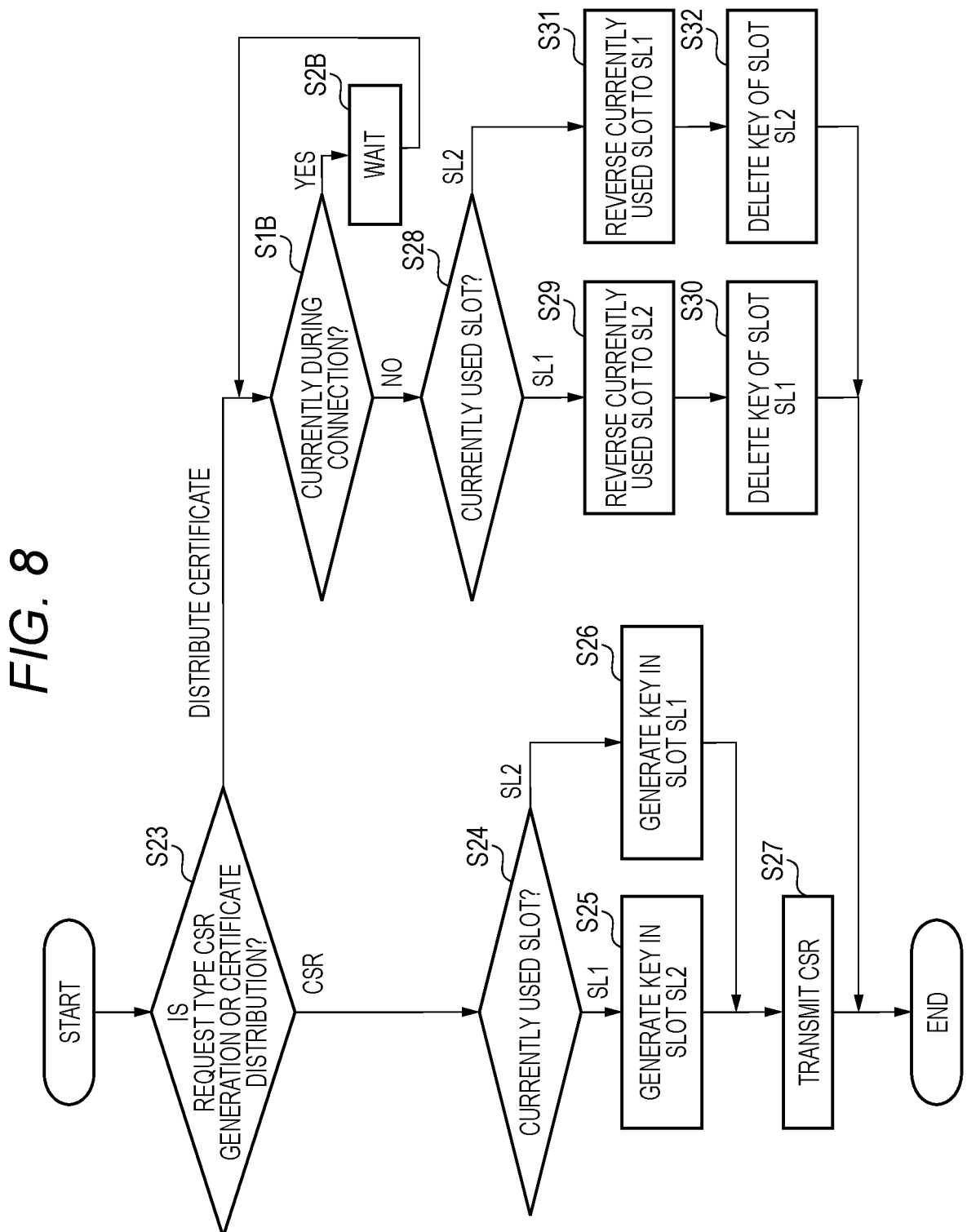
FIG. 8 shows a process flow of a charge control device according to the third embodiment.

FIG. 8 shows a process flow of the charge control device 10 according to the third embodiment. Similarly to the process of FIG. 5, the process of FIG. 8 is activated, for example, when the charge control device 10 receives a request from an external device, for example, the OEM server 6 via the external communication unit 16A. As in FIG. 5, it is assumed that the currently used private key is the private key KS1 and the certificate C1 is valid at the time of the activation.

In the process of FIG. 8, unlike FIG. 5, the charge control device 10 determines whether the vehicle 1 is connected to the charging facility 2, and does not execute the process (the determination of S1 and the process of S2 in FIG. 5) when the vehicle 1 is connected to the charging facility 2. That is, the charge control device 10 determines a type of the request received via the external communication unit 16A regardless of whether the vehicle 1 is connected to the charging facility 2 (S23). When the type of the received request is a CSR generation request (CSR in S23), the charge control device 10 executes processes from S24 to S27. The processes from S24 to S27 are the same as the processes from S4 to S7 in FIG. 5, and descriptions thereof are omitted. In the processes from S24 to S27, the charge control device 10 stores the second private key KS2 and requests the OEM server 6 or the like, which is a certificate issuer, to install the second certificate C2.

On the other hand, when it is determined in S23 that the request is to distribute the certificate (the certificate distribution in S23), the charge control device 10 determines whether the vehicle 1 is currently connected to the charging facility 2 (S1B). When the vehicle 1 is currently connected to the charging facility 2, the charge control device 10 waits (S2B). The waiting method is the same as S2A in FIG. 6.

During the waiting period, the charge control device 10 may execute a process by, for example, the current key in another parallel process. According to the determination in S1B and the waiting in S2B, when the charge control device 10 receives the request from the OEM server 6 or the like that is an issuer, it can be said that the first private key KS1 is valid at least while the vehicle 1 is connected to the charging facility 2. It can also be said that the charge control device 10 does not use the key generated during a charging session during the charging session.

After waiting, when the vehicle 1 is not connected to the charging facility 2, the charge control device 10 executes processes from S28 to S32. The processes of S28 to S32 are the same as those of S8 to S12 in FIG. 5, and thus descriptions thereof are omitted. That is, the charge control device 10 stores the private key KS1 corresponding to the currently valid certificate C1 and the private key KS2 corresponding to the certificate C2 to be newly acquired in the future in different slots SL1 and SL2, respectively. The private key KS1 is valid until the installation of the new certificate C2 is completed, and the private key KS2 is valid when the installation of the new certificate C2 is completed. That is, when the charge control device 10 receives the certificate from the OEM during the charging session, the charge control device 10 does not immediately switch the currently used key but switches the currently used key after the charging session ends.

As described above, when the vehicle 1 is connected to the charging facility 2 authorizing based on the first certificate C1 and the first private key KS1, the charge control device 10 does not execute a negative response or wait even when receiving the CSR generation request from the OEM server 6 or the like which is a certificate issuer. That is, the charge control device 10 newly creates a pair of the public key KO2 and the private key KS2, and stores at least the private key K2 in the slot SL2.

Then, the charge control device 10 transmits a CSR to the OEM server 6 or the like which is an issuer of the CSR generation request, and requests issuance (and installation) of the second certificate C2. The charge control device 10 validates the first private key KS1 at least while the vehicle 1 is connected to the charging facility 2. For this reason, even when the charge control device 10 receives the CSR generation request when the vehicle 1 is connected to the charging facility 2, the charge control device 10 continues the process by the private key KS1 which is the current key. In parallel with this process, the charge control device 10 can request the OEM server 6 or the like to issue (and install) the second certificate C2. In this case, the private key KS1 that is the current key would not be overwritten with the new private key KS2. In addition, creation of a signature, a request for authentication to the charging facility 2, and the like would not be interrupted before issuance (and installation) of the second certificate C2 is completed.

When the charge control device 10 waits as in S1B and S2B, the first private key KS1 is valid at least while the vehicle 1 is connected to the charging facility 2. Upon receiving a request from the OEM server 6 that is a certificate issuer regardless of whether the vehicle 1 is connected to the charging facility 2, the charge control device 10 newly stores the second private key KS2 in the slot SL2 and requests the OEM server 6 to install the second certificate C2. However, after that, when the second certificate C2 is further received from the OEM server 6 during the connection to the charging facility 2, the charge control device 10 waits and validates the first private key KS1 at least during the connection to the charging facility 2. Accordingly, the charge control device 10 can continue the process by the first private key KS1 that is currently being processed, and can obtain authentication by a signature.

When the installation of the second certificate C2 is completed, the charge control device 10 validates the second private key KS2. Accordingly, the charge control device 10 can smoothly transition from the process by the first certificate C1 and the first private key KS1 to the process by the second certificate C2 and the second private key KS2 without interruption. That is, the charge control device 10 can continuously execute the process of requesting authentication by a certificate. The charge control device 10 can execute PnC charge without stopping a service until the OEM server 6 issues a certificate and installs the certificate in the charge control device 10 after the charge control device 10 generates the key of the certificate to be verified.

Computer-Readable Recording Medium

A program that causes a computer or another machine or device (hereinafter, referred to as a computer or the like) to implement one of the above functions can be recorded on a computer-readable recording medium. The function can be provided by causing the computer or the like to read and execute the program on the recording medium.

Here, the computer-readable recording medium refers to a recording medium that stores information such as data and programs by an electrical, magnetic, optical, mechanical, or chemical operation and can be read by a computer or the like. Among such recording media, a medium that is removable from the computer or the like includes, for example, a memory card such as a flexible disc, a magneto-optical disc, a CD-ROM, a CD-R/W, a DVD, a Blu-ray disc, and a flash memory. A recording medium fixed in a computer or the like includes a hard disk, a read only memory (ROM), or the like. A solid state drive (SSD) may be used as a recording medium movable from a computer or the like or a recording medium fixed to a computer or the like.

Others

The present embodiments include the following aspects (hereinafter referred to as appendixes).

APPENDIX 1

A charge control device for a vehicle including:
a controller configured to communicate with a charging facility for a charge authentication, the controller storing a first private key corresponding to a first certificate in a first area of a memory, in which the controller is configured to:

generate a second private key and a public key in response to a request from a certificate issuer;

store the second private key in a second area of the memory different from the first area;

transmit the public key to the certificate issuer to receive a second certificate issued by the certificate issuer;

maintain use of the first private key until an installation completion of the second certificate; and use the second private key upon the installation completion.

APPENDIX 2

The charge control device according to Appendix 1, in which the controller is configured not to overwrite the first private key with the second private key.

APPENDIX 3

The charge control device according to Appendix 1, in which the controller is configured to communicate with the charging facility for the charge authentication based on the first or second private key that is valid and a certificate corresponding to the first or second private key that is valid.

APPENDIX 4

The charge control device according to Appendix 1, in which the controller is configured to erase the first private key upon the installation completion of the second certificate.

APPENDIX 5

The charge control device according to Appendix 1, in which the controller is configured to reject the request upon receiving the request from the certificate issuer during connection to the charging facility.

APPENDIX 6

The charge control device according to Appendix 1, in which the controller is configured to store the second private key, request the certificate issuer for installation of the second certificate, and use the first private key at least during the connection to the charging facility, upon receiving the request from the certificate issuer during connection to the charging facility based on the first certificate and the first private key.

APPENDIX 7

The charge control device according to Appendix 6, in which the controller is configured to communicate with the charging facility for the charge authentication based on the first private key that is valid and the first certificate corresponding to the first private key.

APPENDIX 8

The charge control device according to Appendix 6, in which the controller is configured to use the second private key upon the installation completion of the second certificate.

APPENDIX 9

The charge control device according to Appendix 8, in which the controller is configured to erase the first private key and communicate with the charging facility for the charge authentication based on the second private key that is valid and the second certificate, upon the installation completion of the second certificate.

APPENDIX 10

A program that causes a controller to perform a process, the controller being configured to communicate with a charging facility for a charge authentication, the controller storing a first private key corresponding to a first certificate in a first area of a memory, the process comprising:

generating a second private key and a public key in response to a request from a certificate issuer;

storing the second private key in a second area of the memory different from the first area;

transmitting the public key to the certificate issuer to receive a second certificate issued by the certificate issuer;

maintaining use of the first private key until an installation completion of the second certificate; and using the second private key upon the installation completion.

APPENDIX 11

A charge control method for a controller configured to communicate with a charging facility for a charge authentication, the controller storing a first private key corresponding to a first certificate in a first area of a memory, the charge control method including:

generating a second private key and a public key in response to a request from a certificate issuer;

storing the second private key in a second area of the memory different from the first area;

transmitting the public key to the certificate issuer to receive a second certificate issued by the certificate issuer;

maintaining use of the first private key until an installation completion of the second certificate; and using the second private key upon the installation completion.

The invention claimed is:

1. A charge control device for a vehicle, the device comprising:

a controller capable of communicating with a charging facility for charging an electric power to the vehicle, wherein the controller is configured to:

store a current private key and a current certificate;

create a signature based on the current private key and the current certificate;

transmit the signature to the charging facility for an authentication to initiate charging the electric power;

generate and store a new private key and a new public key in response to a request from a certificate issuer;

transmit the new public key to the certificate issuer;

receive and store a new certificate issued by the certificate issuer;

check whether the vehicle is connected to the charging facility;

maintain use of the current private key for creating the signature and withhold use of the new private key if the vehicle is connected to the charging facility; and

replace the current private key and the current certificate with the new private key and the new certificate if the vehicle is not connected to the charging facility.

2. The charge control device according to claim 1, wherein the controller is configured not to overwrite the current private key with the new private key.

3. The charge control device according to claim 1, wherein the controller is configured to communicate with the charging facility for the authentication based on the current or new private key that is valid and a certificate corresponding to the current or new private key that is valid.

4. The charge control device according to claim 1, wherein the controller is configured to erase the current private key upon installation completion of the new certificate.

5. The charge control device according to claim 1, wherein the controller is configured to reject the request upon receiving the request from the certificate issuer during connection to the charging facility.

6. The charge control device according to claim 1, wherein the controller is configured to communicate with the charging facility for the authentication based on the current private key that is valid and the current certificate corresponding to the current private key.

7. The charge control device according to claim 1, wherein the controller is configured to use the new private key after connection to the charging facility is complete.

8. The charge control device according to claim 7, wherein the controller is configured to erase the current private key and communicate with the charging facility for the authentication based on the new private key that is valid and the new certificate, after the connection to the charging facility is complete.

9. A non-transitory computer-readable storage medium storing a program that causes a controller to perform a process, the controller being capable of communicating with a charging facility for charging an electric power to a vehicle, the process comprising:

storing a current private key and a current certificate;

creating a signature based on the current private key and the current certificate;

transmitting the signature to the charging facility for an authentication to initiate charging the electric power;

generating and storing a new private key and a new public key in response to a request from a certificate issuer;

transmitting the new public key to the certificate issuer;

receiving and storing a new certificate issued by the certificate issuer;

checking whether the vehicle is connected to the charging facility;

maintaining use of the current private key for creating the signature and withholding use of the new private key if the vehicle is connected to the charging facility; and replacing the current private key and the current certificate with the new private key and the new certificate if the vehicle is not connected to the charging facility.

10. A charge control method for a controller capable of communicating with a charging facility for charging an electric power to a vehicle, the charge control method comprising:

storing a current private key and a current certificate;

creating a signature based on the current private key and the current certificate;

transmitting the signature to the charging facility for an authentication to initiate charging the electric power;

generating and storing a new private key and a new public key in response to a request from a certificate issuer;

transmitting the new public key to the certificate issuer;

receiving and storing a new certificate issued by the certificate issuer;

checking whether the vehicle is connected to the charging facility;

maintaining use of the current private key for creating the signature and withholding use of the new private key if the vehicle is connected to the charging facility; and replacing the current private key and the current certificate with the new private key and the new certificate if the vehicle is not connected to the charging facility.

* * * * *